No. 701,361. Patented June 3, 1902.
M. KUEHN.
COMBINED FENDER AND BRAKE.
(Application filed Feb. 24, 1902.)
(No Model.)
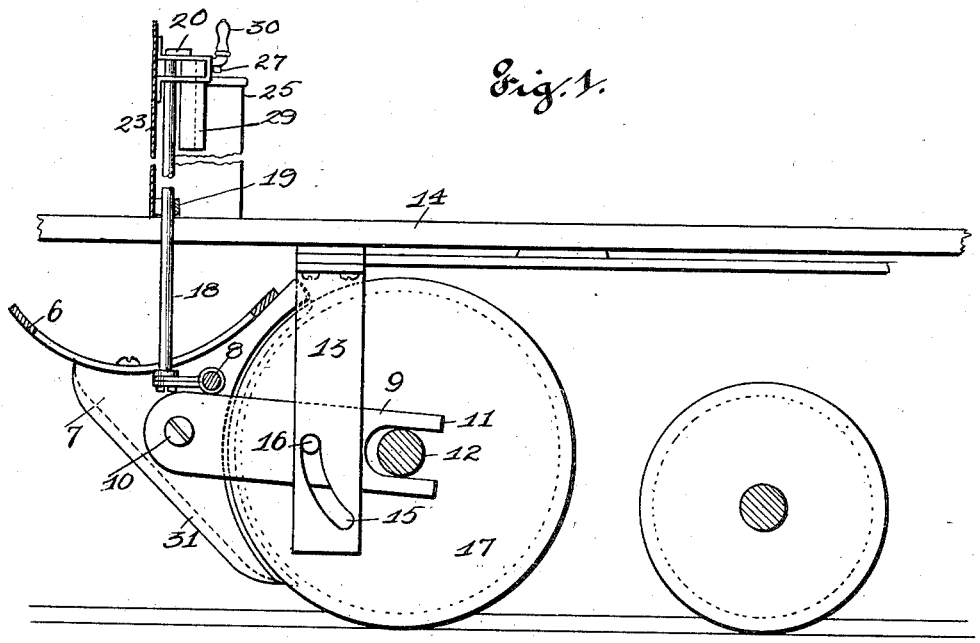
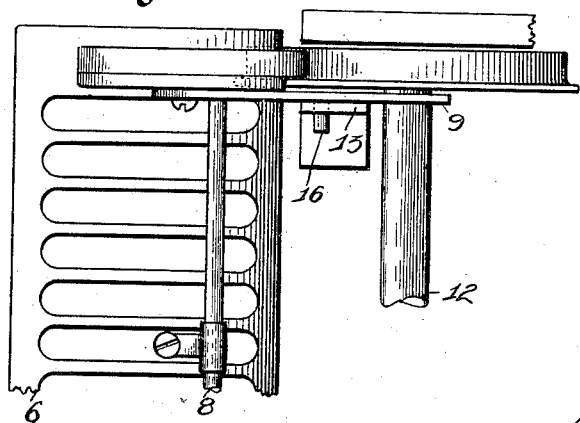
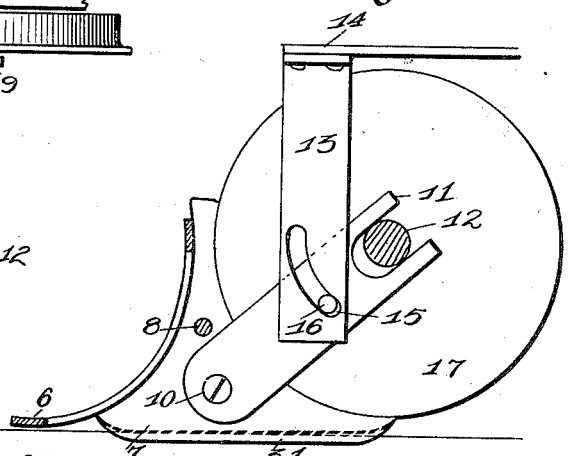
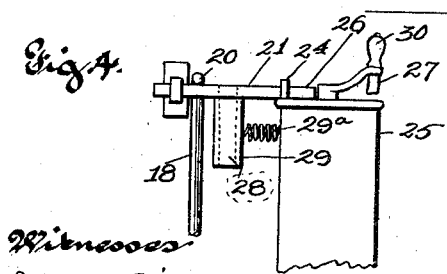
Witnesses:
Alfred W. Eicker
Frank Turner
Inventor:
Michael Kuehn
by Higdon & Longan attys.

UNITED STATES PATENT OFFICE.

MICHAEL KUEHN, OF ST. LOUIS, MISSOURI, ASSIGNOR OF ONE-HALF TO CHARLES C. CRONE, OF ST. LOUIS, MISSOURI.

COMBINED FENDER AND BRAKE.

SPECIFICATION forming part of Letters Patent No. 701,361, dated June 3, 1902.

Application filed February 24, 1902. Serial No. 95,474. (No model.)

*To all whom it may concern:*

Be it known that I, MICHAEL KUEHN, of the city of St. Louis, State of Missouri, have invented certain new and useful Improvements in a Combined Fender and Brake, of which the following is a full, clear, and exact description, reference being had to the accompanying drawings, forming a part hereof.

My invention relates to combined car fenders and brakes; and it consists of the novel construction, combination, and arrangement of parts hereinafter shown, described, and claimed.

My object is to construct a combined car fender and brake so that when a motorman sees a person on the track he can drop the fender and set the brake by slamming the controller home and shutting off the current; and my invention consists of a fender-scoop, brake-blocks attached to the ends of the fender, brake-blocks connected to the ends of the fender-scoop, fork-arms pivotally connected to the brake-blocks with the forks embracing the axle, hangers rigidly attached to the car-bed and extending downwardly beside said forks, there being cam-slots in the lower ends of said hangers, pins rigidly fixed in said forks and operating in said cam-slots as required to move the brake-blocks to and from the car-wheels as the fender-scoop is raised and lowered, an operating-rod extending upwardly from the frame of the fender to a point adjacent the controller, a hook on the upper end of said operating-rod, and a slide mounted in position to be operated by the home impact of the controller, said slide engaging said hook to hold the fender elevated and having a notch through which said hook passes when the slide is operated to release the fender.

Figure 1 is a vertical section of a car-truck, showing my improved fender and brake applied and ready for use. Fig. 2 is a bottom plan view of the parts shown in Fig. 1. Fig. 3 is a view analogous to Fig. 1 and showing the fender down and the brake applied. Fig. 4 is a side elevation of the controller and showing the means of holding the fender up and releasing it by the home impact of the controller. Fig. 5 is a plan view of the parts shown in Fig. 4.

Referring to the drawings in detail, the fender-scoop 6 has the brake-blocks 7 attached to its ends, and a rod 8 connects the brake-blocks rigidly together. The forks 9 are pivotally connected to the brake-blocks 7 by the screws 10, the bearings 11 of said forks embracing the axle 12 of the car-truck. The brakes 13 are rigidly attached to the bed 14 of the car and extend downwardly beside the forks 9, there being cam-slots 15 in the lower ends of said brackets. The pins 16 are rigidly fixed in the forks 9 and operate in the cam-slots 15, so that when the fender is elevated the brake-blocks 7 are moved away from the wheel 17, and when the fender is dropped the brake-blocks are moved toward the wheel.

It is obvious that the cam-slots 15 are slightly eccentric relative to the axle 12. The operating-rod 18 is attached to the rod 8 and extends upwardly through the car-bed and through the bearing 19 and has a hook 20 on its upper end. The slide 21 is mounted in a bearing 22, attached to the dashboard 23, and in a bearing 24, attached to the controller-box 25, and the hook 20 rests upon the slide and holds the fender and brake-blocks elevated. The end 26 of the slide is in position to be engaged by the arm 27, carried by the controller-handle, and when the controller-handle is slammed home to shut off the current the slide 21 is moved until the hook 20 passes downwardly through the slot 28. A channel-bar 29 extends downwardly from the slide 21 in alinement with the slot 28 and forms a guide for the hook 20, and a spring 29$^a$ connects the channel-bar 29 to the controller-box 25, so that when the fender is elevated until the hook passes upwardly to a position above the slide the spring 29$^a$ will move the slide to bring the slot 28 out of alinement with the hook 20, thus holding the fender elevated.

When the slide 21 is operated by the home impact of the controller-handle 30, the hook passes downwardly into the channel-bar 29, the fender drops to the position shown in Fig. 2, with the brake-blocks 7 under the wheels 17, thus raising the wheels off the track. The shoes 31 are formed on the lower faces of the brake-blocks 7 to slide on the track when the fender is down, as shown in Fig. 3. If the fender has been dropped and the brake set, it is necessary to reverse the motor in order to run the wheel off the brake-blocks 7, so that the fender may again be raised.

I claim—

1. In a device of the class described, a fender-scoop; brake-blocks attached to the ends of the fender-scoop; forks pivotally attached to the brake-blocks, and embracing the car-axle; hangers extending downwardly from the car-bed and having cam-slots in their lower ends; pins rigidly fixed in said forks and operating in said cam-slots as required to move the brake-blocks away from the car-wheel when the fender is elevated, and move the brake-blocks to the car-wheels when the fender is lowered; and means of raising and lowering the fender, substantially as specified.

2. In a device of the class described a fender-scoop; brake-blocks attached to the ends of the fender-scoop; forks pivotally connected to the brake-blocks and embracing the car-axle; hangers extending downwardly from the car-bed, and having cam-slots in their lower ends; pins rigidly fixed in said forks and operating in said cam-slots; an operating-rod extending upwardly from the frame of the fender; a hook at the upper end of said operating-rod; a slide mounted in position to be operated by the home impact of the controller, and in position to engage said hook, so that when the controller is operated to shut off the current, the slide will be moved to release the hook and thereby the fender, and set the brake, substantially as specified.

3. In a device of the class described, brake-blocks framed together; forks pivotally connected to the brake-blocks, and embracing the car-axle; hangers extending downwardly from the car-bed, and having cam-slots in their lower ends; pins rigidly fixed in said forks and operating in said cam-slots as required to move the brake-blocks to and from the car-wheels; and means of raising and lowering the brake-blocks, substantially as specified.

In testimony whereof I affix my signature in presence of two witnesses.

MICHAEL KUEHN.

Witnesses:
ALFRED A. EICKS,
JOHN C. HIGDON.